(12) United States Patent
Nimmagadda et al.

(10) Patent No.: US 12,499,362 B2
(45) Date of Patent: Dec. 16, 2025

(54) MODEL OPTIMIZATION IN INFRASTRUCTURE PROCESSING UNIT (IPU)

(71) Applicant: Intel Corporation, Santa Clara, CA (US)

(72) Inventors: Yamini Nimmagadda, Portland, OR (US); Susanne M. Balle, Hudson, NH (US); Olugbemisola Oniyinde, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 936 days.

(21) Appl. No.: 17/480,236

(22) Filed: Sep. 21, 2021

(65) Prior Publication Data

US 2022/0207358 A1 Jun. 30, 2022

(51) Int. Cl.
| | |
|---|---|
| *G06N 3/08* | (2023.01) |
| *G06F 9/50* | (2006.01) |
| *G06N 3/063* | (2023.01) |

(52) U.S. Cl.
CPC ............ *G06N 3/08* (2013.01); *G06F 9/5027* (2013.01); *G06N 3/063* (2013.01)

(58) Field of Classification Search
CPC ........................................................ G06N 3/08
USPC ........................................................ 706/15
See application file for complete search history.

(56) References Cited

U.S. PATENT DOCUMENTS

| | | | |
|---|---|---|---|
| 10,983,761 B2 * | 4/2021 | Svyatkovskiy | G06F 16/9027 |
| 2020/0302298 A1 * | 9/2020 | Van Baalen | G06N 3/04 |
| 2021/0350210 A1 * | 11/2021 | Gong | G06N 3/063 |
| 2021/0383206 A1 * | 12/2021 | Teppoeva | G06F 11/004 |
| 2022/0019461 A1 * | 1/2022 | Balle | G06F 9/4856 |
| 2022/0091915 A1 * | 3/2022 | Perneti | G06F 3/0653 |
| 2022/0207358 A1 * | 6/2022 | Nimmagadda | G06N 3/08 |
| 2022/0261685 A1 * | 8/2022 | Sabat | G06F 18/25 |
| 2024/0296283 A1 * | 9/2024 | Wei | G06F 18/213 |

* cited by examiner

*Primary Examiner* — Reza Nabi
(74) *Attorney, Agent, or Firm* — JAFFERY WATSON HAMILTON & DESANCTIS LLP

(57) ABSTRACT

An Infrastructure Processing Unit (IPU), including: a model optimization processor configured to optimize an artificial intelligence (AI) model for an accelerator managed by the IPU, and deploy the optimized AI model to the accelerator for execution of an inference; and a local memory configured to store data related to the AI model optimization.

7 Claims, 2 Drawing Sheets

MODEL OPTIMIZATION IN INFRASTRUCTURE PROCESSING UNIT (IPU)

TECHNICAL FIELD

The present disclosure generally relates to artificial intelligence model optimization in an Infrastructure Processing Unit (IPU).

BACKGROUND

In disaggregated computing, an infrastructure processing unit (IPU) manages accelerators by dispatching workloads without the involvement of a host central processing unit (CPU). The workloads typically use cross-architecture computing solutions across chip types (e.g., CPUs, FPGAs, and other accelerators (xPUs)), together in a single application programming interface, which assigns each task to the chip best suited for the particular task.

Artificial intelligence (AI) inference is deployed on accelerators. There are numerous processes that are performed on an AI model before running this inference. Performing these processes on a central processing unit (CPU) creates a bottleneck to leveraging the benefits of disaggregated computing.

DESCRIPTION OF THE ASPECTS

The present disclosure is directed to artificial intelligence model optimization in an Infrastructure Processing Unit (IPU). Model optimization steps are offloaded to the IPU to deploy the models on the accelerators in a headless manner without using a Central Processing Unit (CPU).

Figure 1:
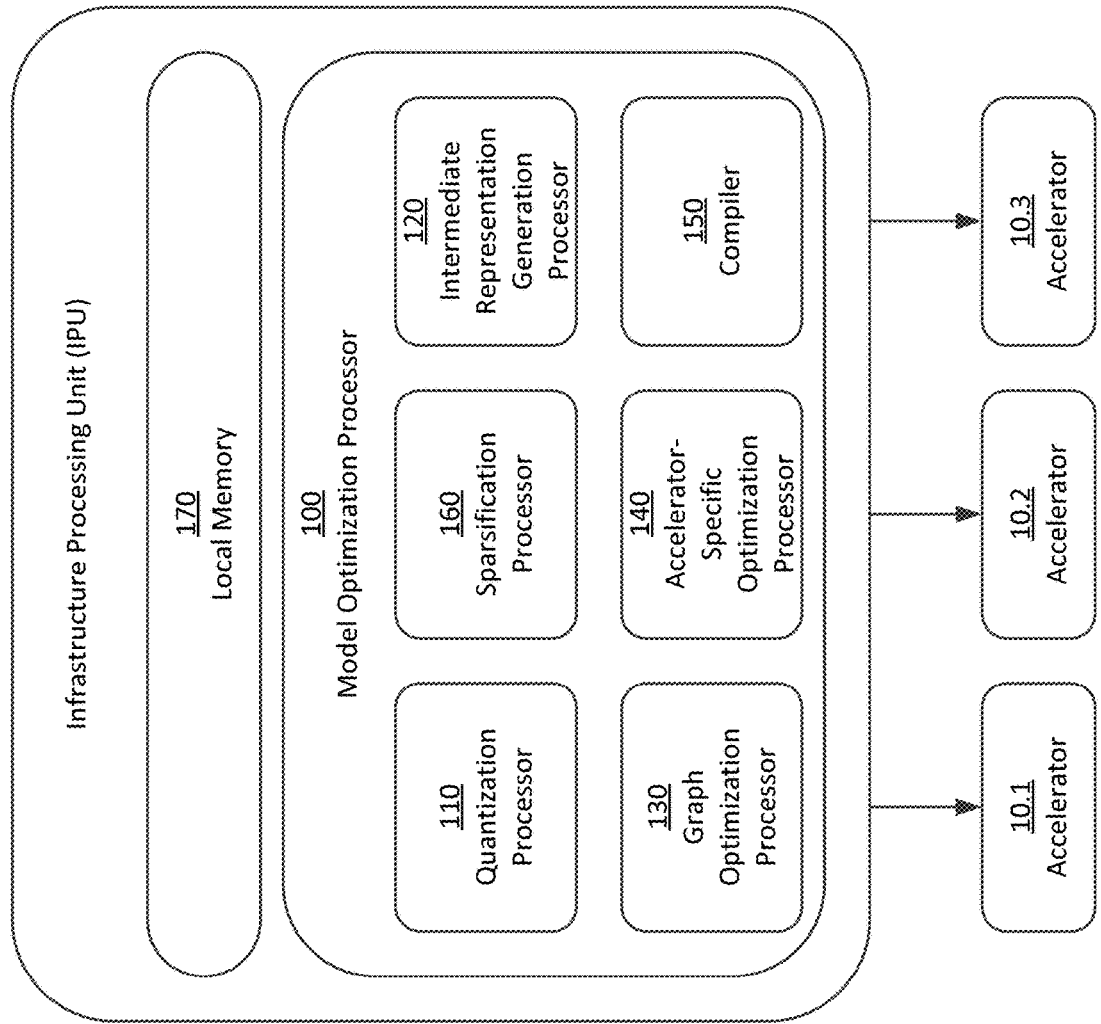
FIG. 1 illustrates a model optimization processor in an Infrastructure Processing Unit (IPU) in accordance with aspects of the disclosure.
Figure 2:
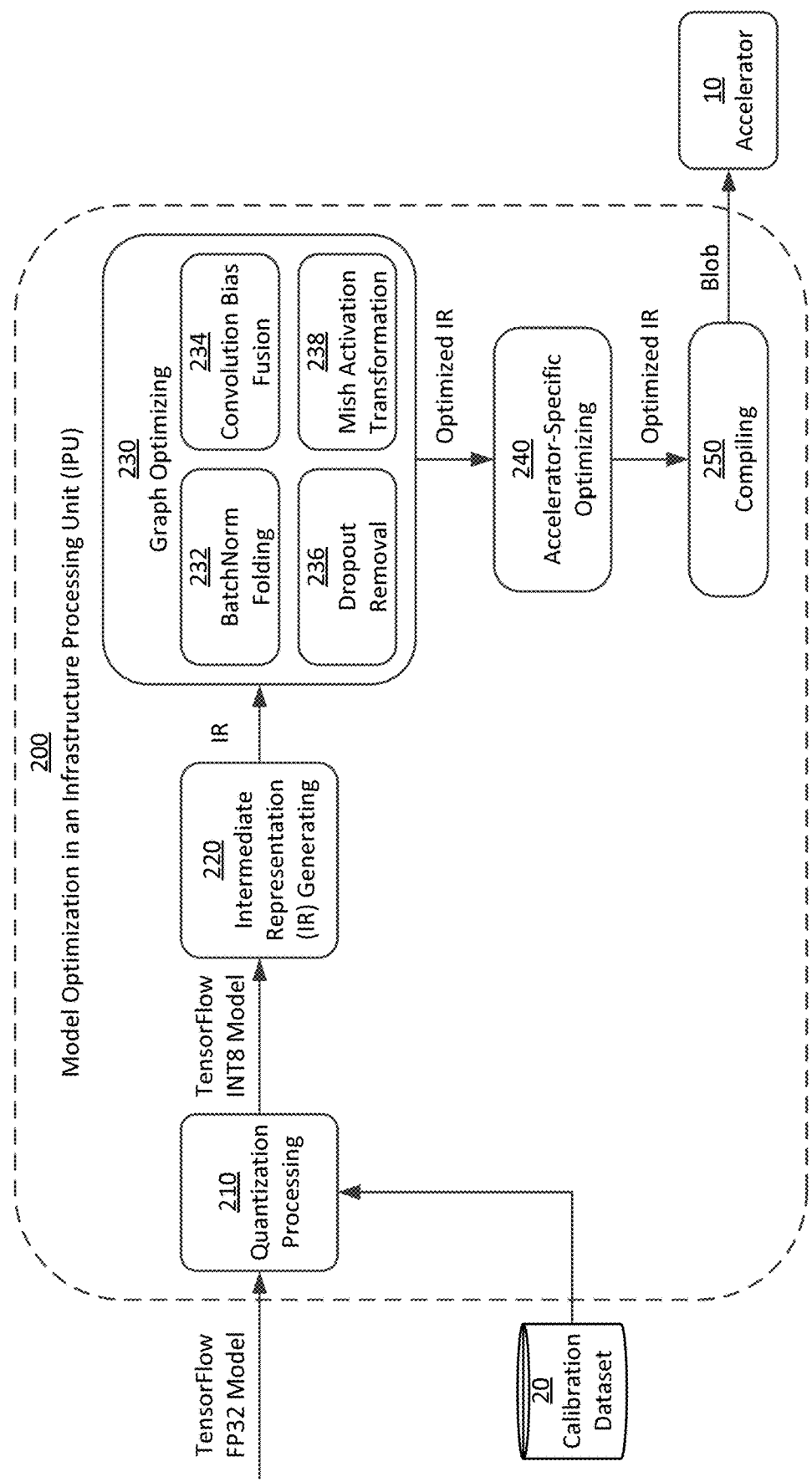
FIG. 2 illustrates a flow diagram of model optimization in an IPU in accordance with aspects of the disclosure.

FIG. 1 illustrates a model optimization processor 100 in an Infrastructure Processing Unit (IPU) in accordance with aspects of the disclosure. And FIG. 2 illustrates a flow diagram of model optimization 200 in an IPU in accordance with aspects of the disclosure.

By way of overview, the figures illustrate an example of steps performed in the IPU before deploying a pre-trained TensorFlow (TF) 32-bit floating point (FP32) model on an accelerator 10 with 8-bit integer (INT8) support. The model optimization processor 100 first quantizes the TF FP32 model into a TF INT8 model using post-training quantization and a calibration dataset 20. The model optimization processor 100 then converts the TF INT8 model into an Intermediate Representation (IR), and optimizes the IR through a series of high-level graph optimizations and low-level accelerator-specific optimizations. Finally, the model optimization processor 100 converts the optimized IR into a blob that is compatible with the accelerator 10 before deployment.

More specifically, the IPU comprises a model optimization processor 100 and a local memory 170. The IPU is configured to manage one or more accelerators 10 (10.1, 10.2, 10.3 . . . ).

The model optimization processor 100 is configured to optimize an artificial intelligence (AI) model for an accelerator 10 managed by the IPU, and deploy the optimized AI model to the accelerator 10 for execution of an inference.

The local memory 170 is configured to store data related to the AI model optimization. The local memory 170 provides for faster transfer of data from one operation to another. The local memory 170 is configured to store model weights, quantization parameters such as scale and zero-point values, intermediate representations, compiled models, etc. This local storage reduces latency caused by data transfer to/from an external storage during operations, and improves the overall model optimization efficiency.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, among others, or any combination thereof. Registers, shift registers, processor registers, data buffers, among others, are also embraced herein by the term memory.

An AI algorithm may include a machine learning algorithm, or more specifically, a deep learning algorithm. A machine learning algorithm may include anything from a threshold algorithm to a more complicated algorithm, such as an artificial neural network or support vector machine (SVM). Many algorithms exist and are in the process of being developed. This disclosure is not limited to any particular AI algorithm.

The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning model described herein may take any suitable form or utilize any suitable technique (e.g., for training purposes). For example, any of the machine learning models may utilize supervised learning, semi-supervised learning, unsupervised learning, or reinforcement learning techniques.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

In the example shown, the AI model is a deep learning model. The deep learning model input to the example pipeline is pre-trained using an AI framework such as TensorFlow, PyTorch, MXNet etc. The training is typically performed using 32-bit floating point (FP32) computation, and the model produced from the training is represented in FP32 format.

The model optimization processor 100 comprises a quantization processor 110, an intermediate representation generation processor 120, a graph optimization processor 130, an accelerator-specific optimization processor 140, a compiler 150, and a sparsification processor 160.

The quantization processor 110 is configured to approximate, based on a calibration dataset 20 provided by a user, a neural network of the deep learning model from floating-point precision to a lower bit width precision. This post-training quantization converts the 32-bit floating point model to a more compact, lower-precision format such as 16-bit floating point or 8-bit integer formats. Accelerators 10 typically support low precision formats to provide high performance inference capabilities. Post-training quantization includes steps such as rounding, truncation, and/or quantization scale multiplication of input values. This step uses the calibration dataset 20 to calculate the scale and zero-point values required for rounding/truncating the weights in the deep learning model to maintain the accuracy while inferring the data in the dataset.

The intermediate representation generation processor 120 is configured to convert the deep learning model into an intermediate representation of the deep learning model. Different AI frameworks produce deep learning models of different formats. For example, TensorFlow models are often represented in a protobuf (.pb) format, PyTorch models are saved in ONNX (.onnx) format, and so on. Intermediate Representation (IR) generation 220, which includes steps such as graph translation and/or lowering, converts these formats into an intermediate representation (IR), which is subsequently used to apply high-level (accelerator independent) and low-level (accelerator dependent) optimizations 130, 140. A deep learning model graph from the AI framework is lowered to the IR by translating the nodes in the graph to IR nodes that can be interpreted by software and hardware specific to the accelerator vendors.

The graph optimization processor 130 is configured to optimize the IR by applying node fusions, redundant node removal etc. These optimizations reduce the number of operations and memory space required, thereby improving performance.

The graph optimization processor 130 may be configured to perform a graph optimizing function 230 selected from the group of functions consisting of BatchNorm folding 132, dropout removal 136, convolution bias fusion 134, and mish activation transformation 138. This graph optimization 230 is accelerator-independent.

With BatchNorm folding 232, if the deep learning model graph includes a sequence of "Convolution-→BatchNorm→Scale," operations of BatchNorm and Scale nodes can be folded into Convolution, thereby replacing the sequence with a single operation "Convolution."

Convolution bias fusion 234 may be fused with several operations such as "Relu," "Add," "BiasAdd," etc., in order to reduce the number of operations.

With dropout removal 236, dropout nodes are typically used in training as a regularization mechanism to reduce overfitting to the training data. These nodes are not needed for inference and hence can be removed from the graph. When the nodes are removed, connections are established between the predecessor and successor nodes of dropout.

With Mish activation transformation 238, if the deep learning model graph has a sequence of "Exponential→Add-→Log→Tanh→Multiply," the sequence can be replaced by a single "Mish" activation operation.

The accelerator-specific optimization processor 140 is configured to optimize the deep learning model for the specific accelerator 10. Low-level accelerator-dependent optimizations 240, also referred as target-specific optimizations, optimize the model further by applying optimizations that are specific to the target accelerator 10. Target dependent optimization 240 may include data-type transformations (e.g., some attributes or parameters of the layers can be converted by 16-bit floating point to 16-bit integer types) or other low-level transformations (e.g., a pattern of the standard operators "A→B→C" can be replaced by a custom operator "D"; the operator "D" may not be standard operator, but implemented in the accelerator specifically to improve performance or reduce memory requirements).

The optional sparsification processor 160 is configured to reduce a size of the deep learning model. Model sparsification exploits any underlying sparsity present in a deep learning model, and includes steps such as pruning and/or sparsity mask application. Deep learning models are comprised of layers with several weights and parameters that are learned with the help of input data and labels during the training process. For some models, some of the weights may be zeroes and thus do not impact the output. However, the computation is still performed during the inference, where the input values are multiplied by zeroes. To save on computational costs and memory space, these values are eliminated in the sparsification process for a more efficient inference.

The compiler 150 is configured to compile the optimized graph of the deep learning model into an accelerator-compatible blob format. Complication 250 includes steps such as automatic kernel code generation and/or hardware-specific compilation.

The term "processor" as, for example, used herein may be understood as any kind of technological entity that allows handling of data. The data may be handled according to one or more specific functions executed by the processor. Further, a processor as used herein may be understood as any kind of circuit, e.g., any kind of analog or digital circuit. A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Any of the processors (model optimization processor 100, quantization processor 110, intermediate representation generation processor 120, graph optimization processor 130, accelerator-specific optimization processor 140, and/or sparsification processor 160) disclosed herein may be configured to perform certain functions in accordance with program instructions which may be stored in a memory. In other words, a memory may store software that, when executed by a processor, controls the operation of the system. The term "software" refers to any type of executable instruction, including firmware. A memory may store one or more databases, as well as a trained system, such as a neural network, or a deep neural network, for example. The memory may include any number of random access memories, read only memories, flash memories, disk drives, optical storage, tape storage, removable storage and other types of storage.

In the drawings, some structural or method features may be shown in specific arrangements and/or orderings. However, it should be appreciated that such specific arrangements and/or orderings may not be required. Rather, in some aspects, such features may be arranged in a different manner and/or order than shown in the illustrative figures. Additionally, the inclusion of a structural or method feature in a particular figure is not meant to imply that such feature is required in all aspects and, in some aspects, may not be included or may be combined with other features.

The present disclosure provides autonomous deployment and execution of inference on accelerators in a disaggregated environment. Model optimization and preprocessing steps may be compute-intensive, depending on factors such as the target hardware accelerator, the calibration data size used for quantization, etc. The CPU is freed up for other tasks, and a remote server or cloud is not required to perform model optimization steps offline.

The techniques of this disclosure may also be described in the following examples.

Example 1. An Infrastructure Processing Unit (IPU), comprising: a model optimization processor configured to optimize an artificial intelligence (AI) model for an accelerator managed by the IPU, and deploy the optimized AI model to the accelerator for execution of an inference; and a local memory configured to store data related to the AI model optimization.

Example 2. The IPU of Example 1, wherein the AI model is a deep learning model.

Example 3. The IPU of Example 2, wherein the model optimization processor comprises: a quantization processor configured to approximate, based on a calibration dataset, a neural network of the deep learning model from floating-point precision to a lower bit width precision.

Example 4. The IPU of Example 2, wherein the model optimization processor comprises: an intermediate representation generation processor configured to convert the deep learning model into an intermediate representation of the deep learning model.

Example 5. The IPU of Example 4, wherein the model optimization processor comprises: a graph optimization processor configured to optimize the intermediate representation of the deep learning model.

Example 6. The IPU of Example 5, wherein the graph optimization processor is configured to perform a function selected from the group of functions consisting of BatchNorm folding, dropout removal, convolution bias fusion, and mish activation transformation.

Example 7. The IPU of Example 2, wherein the model optimization processor comprises: an accelerator-specific optimization processor configured to optimize the deep learning model for the accelerator.

Example 8. The IPU of Example 2, wherein the model optimization processor comprises: a compiler configured to compile the deep learning model into a format readable by the accelerator.

Example 9. The IPU of Example 2, wherein the model optimization processor comprises: a sparsification processor configured to reduce a size of the deep learning model.

Example 10. The IPU of Example 1, wherein the AI model is a machine language (ML) model.

Example 11. An Infrastructure Processing Unit (IPU), comprising: a model optimization means for optimizing an artificial intelligence (AI) model for an accelerator managed by the IPU, and for deploying the optimized AI model to the accelerator for execution of an inference; and a local memory means for storing data related to the AI model optimization.

Example 12. The IPU of Example 11, wherein the AI model is a deep learning model.

Example 13. The IPU of Example 12, wherein the model optimization means comprises: an accelerator-specific optimization processing means for optimizing the deep learning model for the accelerator.

Example 14. A method of optimizing a model in an Infrastructure Processing Unit (IPU), comprising: optimizing, by a model optimization processor, an artificial intelligence (AI) model for an accelerator managed by the IPU; storing, in a local memory, data related to the AI model optimization; and deploying, by the model optimization processor, the optimized AI model to the accelerator for execution of an inference.

Example 15. The method of Example 14, wherein the AI model is a deep learning model.

Example 16. The method of Example 15, further comprising: optimizing, by an accelerator-specific optimization processor, the deep learning model for the accelerator.

Example 17. A non-transient computer-readable storage medium storing instructions which, when executed by a processor, implement the method of the IPU according to Example 16.

Example 18. The non-transient computer-readable storage medium of Example 17, wherein the AI model is a deep learning model.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. At least one non-transitory computer-readable medium having stored thereon instructions which, when executed, cause a computing device to perform operations comprising:
optimizing an artificial intelligence (AI) model for an accelerator managed by a processing unit including an Infrastructure Processing Unit (IPU), wherein optimizing includes converting a high precision model to a compact low-precision model, wherein optimizing further includes identifying common processes relating to a model optimization pipeline and offloading the identified common processes to the IPU;
storing data related to the AI model optimization; and
deploying the optimized AI model to the accelerator for execution of an inference.

2. The non-transitory computer-readable medium of claim 1, wherein the operations further comprise managing one or more workloads using the IPU, wherein optimizing includes converting a 32-bit floating point model to a 16-bit floating point model or an 8-bit integer type model, wherein the computing device comprises processing circuitry coupled to a memory, the processing circuitry having one or more of application processing circuitry or graphics processing circuitry.

3. A method comprising:
   optimizing, by a computing device, an artificial intelligence (AI) model for an accelerator managed by a processing unit including an Infrastructure Processing Unit (IPU), wherein optimizing includes converting a high precision model to a compact low-precision model, wherein optimizing further includes identifying common processes relating to a model optimization pipeline and offloading the identified common processes to the IPU;
   storing data related to the AI model optimization; and
   deploying the optimized AI model to the accelerator for execution of an inference.

4. The method of claim 3, further comprising managing one or more workloads using the IPU, wherein optimizing includes converting a 32-bit floating point model to a 16-bit floating point model or an 8-bit integer type model, wherein the computing device comprises processing circuitry coupled to a memory, the processing circuitry having one or more of application processing circuitry or graphics processing circuitry.

5. An apparatus comprising:
   processing circuitry coupled to a memory, the processing circuitry to:
   optimize an artificial intelligence (AI) model for an accelerator managed by an Infrastructure Processing Unit (IPU), wherein to optimize includes to convert a high precision model to a compact low-precision model, wherein optimizing further includes identifying common processes relating to a model optimization pipeline and offloading the identified common processes to the IPU;
   store data related to the AI model optimization; and
   deploying the optimized AI model to the accelerator for execution of an inference.

6. The apparatus of claim 5, further comprising managing one or more workloads using the IPU, wherein to optimize includes to convert a 32-bit floating point model to a 16-bit floating point model or an 8-bit integer type model.

7. The apparatus of claim 5, wherein the processing circuitry comprises one or more of application processing circuitry or graphics processing circuitry.

* * * * *